United States Patent
Snodgrass (10) Patent No.: US 7,512,103 B1
(45) Date of Patent: Mar. 31, 2009

(54) VIRTUAL CHANNEL COMMUNICATIONS SYSTEM

(75) Inventor: Timothy E. Snodgrass, Palo, IA (US)

(73) Assignee: Rockwell Collins, In.c, Cedar Rapids, IA (US)

( * ) Notice: Subject to any disclaimer, the term of this patent is extended or adjusted under 35 U.S.C. 154(b) by 1252 days.

(21) Appl. No.: 10/465,715

(22) Filed: Jun. 19, 2003

(51) Int. Cl.
H04B 7/212 (2006.01)

(52) U.S. Cl. .................. 370/337; 370/463

(58) Field of Classification Search ......... 370/310–350, 370/463; 455/561, 98, 431
See application file for complete search history.

(56) References Cited

U.S. PATENT DOCUMENTS

| | | | | |
|---|---|---|---|---|
| 5,533,029 | A * | 7/1996 | Gardner | 370/329 |
| 5,592,480 | A * | 1/1997 | Carney et al. | 370/347 |
| 6,161,024 | A * | 12/2000 | Komara | 455/562.1 |
| 6,282,180 | B1 * | 8/2001 | Paneth et al. | 370/330 |
| 6,370,386 | B1 * | 4/2002 | Williams | 455/452.1 |
| 6,687,509 | B2 * | 2/2004 | Schmutz et al. | 455/522 |
| 7,050,807 | B1 * | 5/2006 | Osborn | 455/445 |
| 7,076,595 | B1 * | 7/2006 | Dao et al. | 710/317 |
| 7,184,446 | B2 * | 2/2007 | Rashid et al. | 370/424 |

OTHER PUBLICATIONS

Co-filed Patent Application entitled "Universal Power Amplifier", by T. Snodgrass being filed on same date.

* cited by examiner

Primary Examiner—Kwang B Yao
Assistant Examiner—Alex Skripnikov (57) ABSTRACT

A virtual channel communications system assigns RF resources to communications waveforms for transmitting and receiving signals. The communications system comprises universal transceivers for generating and processing the signals. The universal transceivers comprise translators for translating baseband transmit signals to RF transmit signals and RF receive signals to baseband receive signals and digital signal processors for generating the communications waveforms and processing baseband receive and transmit signals. An inter-transceiver communications bus connected to the translators and the digital signal processors communicates between the universal transceivers. The communications bus interconnects digital signal processors in any universal transceiver to a translator in any universal transceiver. Universal power amplifiers are connected to the universal transceivers to amplify the RF transmit signals.

2 Claims, 6 Drawing Sheets

VIRTUAL CHANNEL COMMUNICATIONS SYSTEM

CROSS REFERENCE

Related application co-filed application "Universal Power Amplifier" by Timothy E. Snodgrass, 10/465,771, is hereby incorporated by reference.

BACKGROUND OF THE INVENTION

This invention relates to communications systems and specifically to a virtual channel communications system.

Communications systems frequently require operation over several bands using several different waveforms. These communications systems require varying levels of connectivity and frequently operate simultaneously in receive and transmit modes on several bands. In the past a dedicated channel for each band was implemented on various types of platforms. On a typical airborne platform such as the US Navy E-2C seven or more channels would be implemented with associated transceivers, power amplifiers, and antennas. These multiple channels add to the amount of equipment required with increased weigh and cost with reduced reliability.

Using seven dedicated power amplifiers in an airborne platform such as the E-2C is at a very severe weight penalty when duty cycle numbers indicate that only four amplifiers are needed to provide the required communications connectivity. The use of four power amplifiers with a 100% duty cycle each to service seven waveforms has in past architectures required extensive RF switching. An RF switch matrix is used to route the RF signal from transceivers or antennas to the four power amplifiers. This approach, while providing better capability than traditional non-switched architectures, still has many drawbacks. The RF switch matrix is very complex, large, heavy and also quite expensive. In addition, performance also suffers because of isolation and insertion loss issues inherent in RF switch architectures.

What is needed is a system architecture that provides the required communications connectivity while reducing equipment quantity and weight. Furthermore such a system requires equipment with new capabilities such as a power amplifier that is able to support the varying system channel requirements while offering reduced weight and cost.

SUMMARY OF THE INVENTION

A virtual channel communications system is disclosed. The virtual channel communications system comprises a plurality of PA-translators for transmitting and receiving signals. A plurality of digital signal processors providing desired communications waveforms at predetermined transmit duty cycle requirements. A digital switch is used for switching the plurality of digital signal processors to the plurality of PA-translators. Each PA-translator comprises a power amplifier and a translator.

A number of PA-translators, each power amplifier having a 100-percent duty cycle, equals or exceeds a total predetermined transmit duty cycle requirement of the plurality of digital signal processors. As an example of operation, when one of the digital signal processors connected to a receiver requires transmission the digital switch switches the one digital signal processor to an available PA-translator. The digital switch then switches a digital signal processor previously connected to the available PA-translator to the receiver.

An alternate embodiment of the virtual channel communications system of the present invention uses a dedicated inter-universal transceiver very high speed communications bus that allows signal processing resources in any one universal transceiver to be made available to any other universal transceiver. The very high speed communications bus comprises a TDMA communications bus wherein the digital signal processors and PA-translators communicate within assigned time slots. The communications bus may be implemented with a plurality of field programmable gate arrays programmed as shift registers interconnected in a ring. The digital signal processors may load data into and unload data out of the shift registers. The translators load data into and unload data out of said shift registers.

It is an object of the present invention to implement a system architecture with virtual channels and that provides required communications connectivity while reducing equipment quantity and weight.

It is an object of the present invention to use groups of reprogrammable resources that can be allocated as needed and returned to the group when not needed.

It is an object of the present invention to reduce a number of power amplifiers by switching power amplifiers and translators between digital signal processing functions.

It is an advantage of the present invention to switch and route signals digitally with almost no weight, volume or expense and to provide excellent performance and system flexibility.

It is an advantage of the present invention to utilize a high-speed inter-transceiver communications bus to switch digital signal processors between PA-translators.

It is an advantage of the present invention to provide virtual channels that are built and torn down as required from element in resource groups.

It is a feature of the present invention to provide scalability to add or delete hardware channels without loosing the ability to operate waveforms with the remaining resources.

It is a feature of the present invention to provide virtual channels for all communications waveforms within the system.

It is a feature of the present invention to provide increased reliability with assignable, reconfigurable power amplifiers operating in a pool to form virtual amplifiers upon demand.

BRIEF DESCRIPTION OF THE DRAWINGS

The invention may be more fully understood by reading the following description of the preferred embodiments of the invention in conjunction with the appended drawings wherein.

DETAILED DESCRIPTION

A next generation communications system architecture that provides virtual channels of communications is disclosed. The communications system architecture offers cost and weight reductions and also provides flexible, software defined functionality for the communication system.

Figure 1:
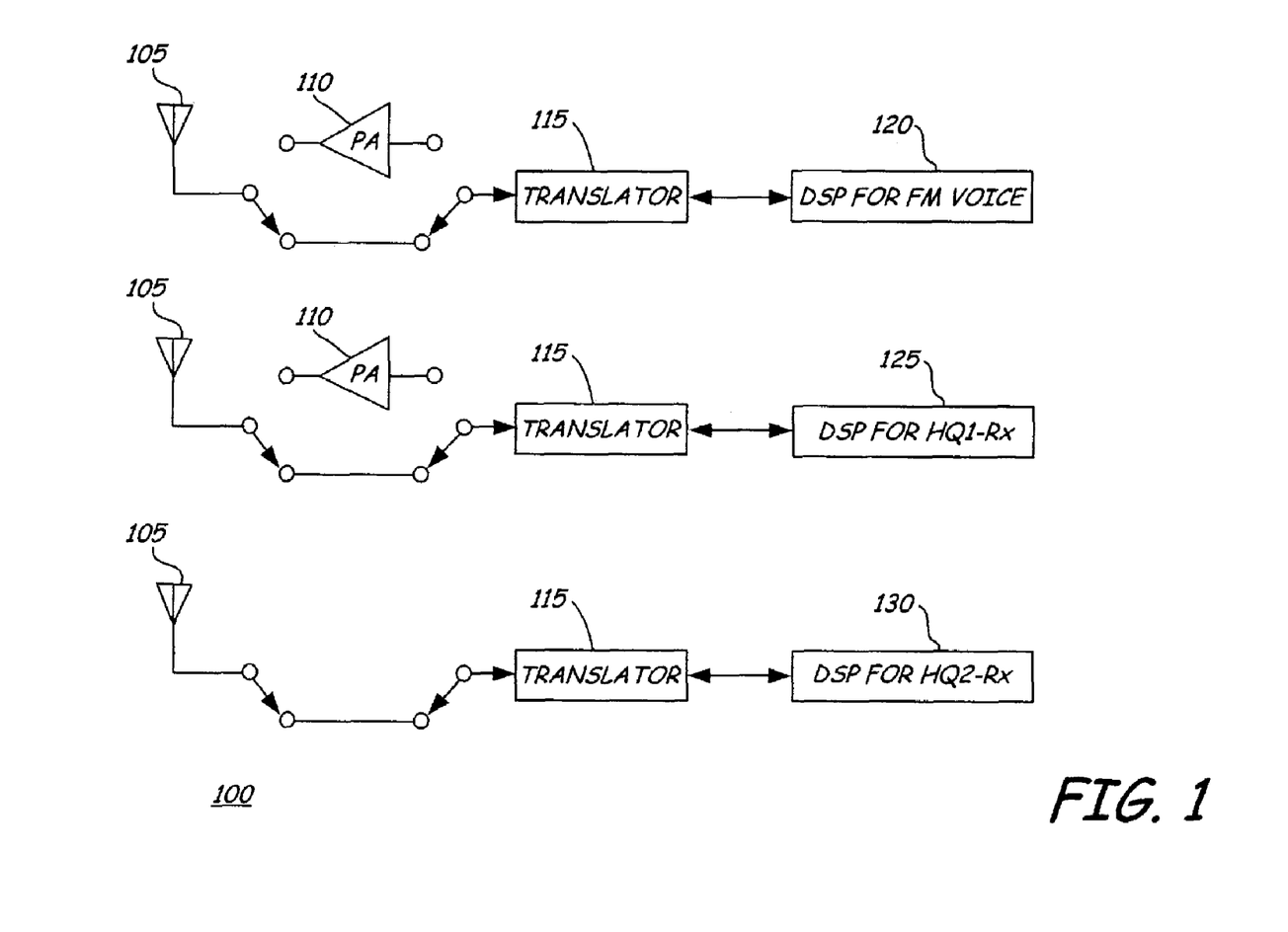
FIG. 1 is a block diagram of a portion of an existing communications system that operates over several bands using several different waveforms on a typical airborne platform.

An existing communications system 100 that operates over several bands using several different waveforms on a typical airborne platform such as the US Navy E-2C is shown in FIG. 1 in simplified form. This communications system 100 provides varying levels of connectivity and frequently operates simultaneously in receive and transmit modes on several bands. A dedicated channel for each band is implemented with three of seven channels on the E-2C shown in FIG. 1 with associated RF translators 115, power amplifiers 110, and antennas 105. Digital signal processing functions 120, 125, and 130 provide communications waveforms for the translators 115. These multiple channels add to the amount of equipment required with increased weigh and cost with reduced reliability.

Power amplifiers (PA) 110 are a very significant contributor to weight. A simple analysis shows what PA 110 availability is required by typical system requirements. Example duty cycles required by a typical specification such as the E-2C for VHF/UHF communications might be three VHF channels at 20% each, three UHF channels at 100% each, and one SATCOM channel at 25% for the total of seven channels with a total duty cycle of 385%.

Using seven dedicated power amplifiers 110 for these channels would be at a total weight of approximately 126 pounds in the current example with 100-watt power amplifiers. This is a severe penalty when these duty cycle numbers only add up to an equivalent of 385% of one power amplifier. Operationally, of the seven channels capable of transmitting, 80% of the time that a VHF channel requests transmission, the request will be denied for thermal duty cycle reasons since the duty cycle of a VHF power amplifier 110 is 20% and therefore not available. Over all, power amplifier availability to the operators is the equivalent of no more than 3.85 power amplifiers.

The use of four VHF/UHF power amplifiers with 100% duty cycle to service seven waveforms has in past architectures required extensive RF switching. The RF switches (not shown) are large complex analog switch matrixes that route the RF signal from one function (translators 115 or antennas 105) to the desired destinations (power amplifiers 110). This approach, while providing better capability than traditional non-switched architectures, still has many drawbacks. When the switches are used at RF levels, particularly at the 100-watt level, they are very large, heavy and also quite expensive. In addition, performance also suffers because of isolation and insertion loss issues inherent in RF switch architectures.

The concept of providing a virtual channel where once dedicated connectivity was used has taken over many fields from commercial telephone lines, Internet Protocol, streaming ATP to satellites, to time division multiple access (TDMA) military waveforms such as Link 16. These innovations have been implemented over something that already worked to either increase flexibility with the same connectivity (e.g. multiple subscribers using the same telephone wires) or to decrease the amount of hardware while providing the same, or virtually the same capability to the same subscribers.

Figure 2:
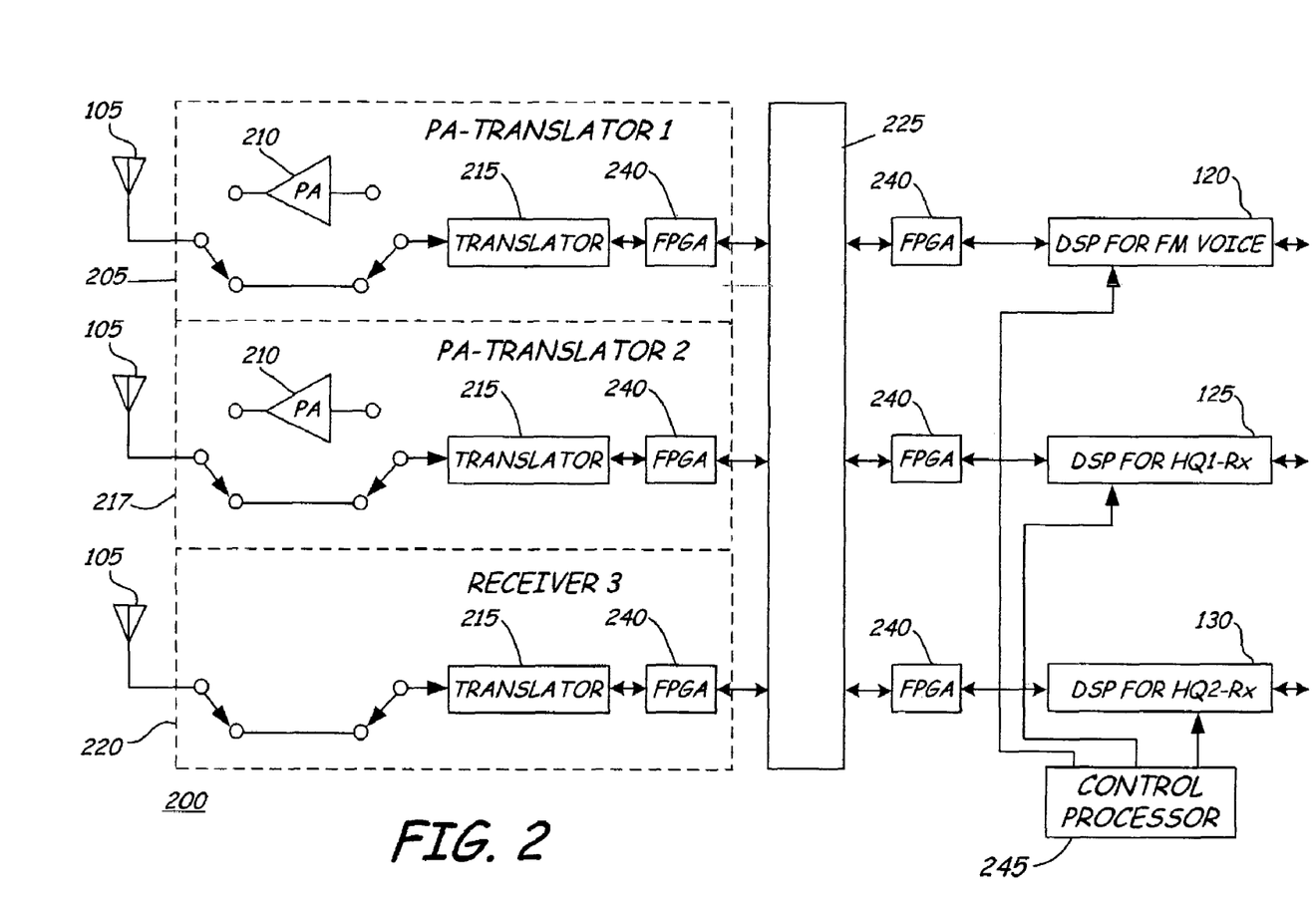
FIG. 2 is a block diagram of an embodiment of a virtual channel communications system of the present invention.

To avoid the weight penalty of dedicated power amplifiers 110, an architecture 200 is disclosed in FIG. 2 that implements a virtual channel concept. This approach utilizes 100% duty cycle power amplifiers 210 with a new concept of dynamic operation that insures a robust and adaptable communications system even in the event of failure. In FIG. 2 two power amplifiers 210 are shown with universal translators 215 that comprise a PA-translator 1 205 and a PA-translator 2 217. A universal translator 215 is used as receiver 3 220 without a PA 210. The universal translators 215 translate baseband signals to RF signals and RF signals to baseband. The universal translators 215 are tunable from 2 MHz to 2000 MHz and capable of being programmed to perform any military waveform within that spectrum used by the E-2C in this example. To meet the requirements of the example E-2C system described above four power amplifiers 210 along with translators 215 are used as will be described below in conjunction with FIG. 4. The power amplifiers 210 may be universal power amplifiers (UPA) as disclosed in the co-filed application.

The virtual channel concept of the present invention may use VHF, UHF, or VHF/UHF power amplifiers or power amplifiers for some other frequency range and still be within the scope of the present invention. The power amplifiers may be 100 watt as used with the E-2C or some other power level either higher or lower and still be within the scope of the present invention. FIG. 2 illustrates a three-channel system with two power amplifiers 210. Three channels are shown in FIG. 2 but any number of channels may be utilized such as seven for the E-2C shown in FIG. 4 and still be within the scope of the present invention.

In the RF communication system 100 of FIG. 1 digital processing takes place at a higher level than the waveform or voice modulation in the translators 215. The digital processing functions 120, 125, and 130 are programmed to perform software functions to generate communications waveforms and process baseband voice and data signals and while reprogrammable, each processor 120, 125, and 130 performs a dedicated function. In the virtual channel communications system 200 of the present invention the digital processing functions 120, 125, and 130 do not remain associated with a particular PA-translator 205, 217 or receiver 220 but connections to the digital processing functions 120, 125, and 130 are constantly being built up and torn down depending on the availability of the PA-translator 205, 217 and receiver 220.

In the present invention when a waveform is activated, software applications in digital processing functions 120, 125, and 130 are assigned to the available RF power amplifiers 210 and translators 215 by a control processor 245. This waveform software remains on the assigned digital processing function 120, 125, and 130 for the duration of that waveform's usage. There is, however, a non-permanent assignment of a translator 215 to the digital hardware 120, 125, and 130 for processing of baseband signals. Complete receive and transmitting capability is made available to each waveform without any RF switching.

Field programmable gate arrays 240 in FIG. 2 are logic functions residing in the PA-translators 205 and 217, receivers 20, and with the digital signal processors 120, 125, 130 for performing interface functions to the digital routing switch 225 or other switching means.

Figure 3:
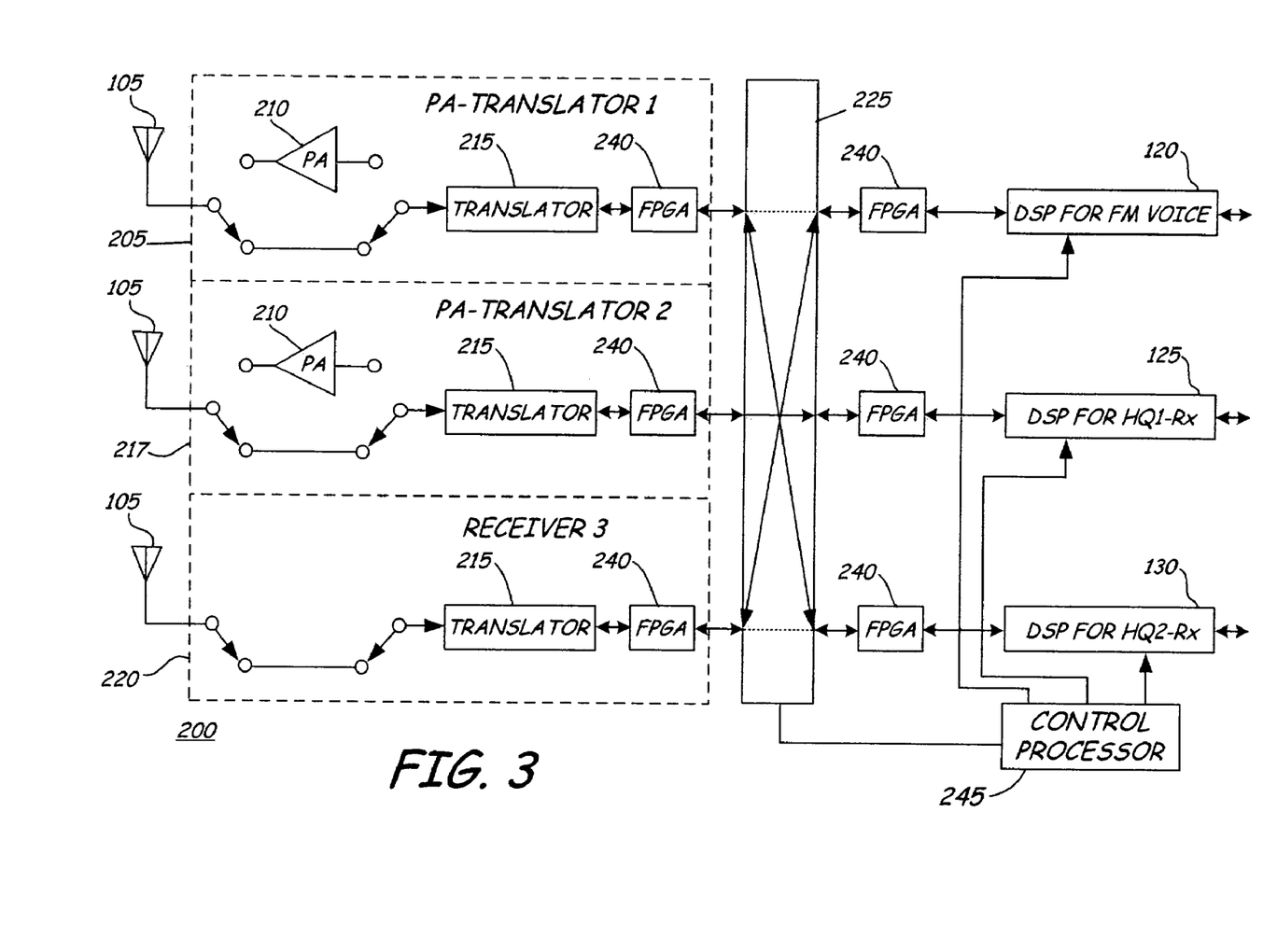
FIG. 3 is a block diagram showing an example of operation of the virtual channel communications system of FIG. 2.

An example of operation is shown in FIG. 3. When the digital processor 130 with a HAVE QUICK waveform (HQ2) needs to transmit, its use of receiver 3 220 is terminated. Receiver 3 220 is tuned to exactly the same parameters required of the digital processor 120 with an FM Voice Rx (receive) waveform, copying the receive setup of PA-translator 1 205 exactly. The receive setup includes such parameters as frequency, filter bandwidths, modulation types, and any other parameters to receive a desired signal. After receiver 3 220 stabilizes and is supplying the same receive signal as PA-translator 1 205, the input to the digital processor 120 for FM Voice Rx is switched synchronously from PA-translator 1 205 to receiver 3 220 with a digital routing switch 225. Digital routing switch may be an Ethernet switch or some other switch known in the art that is capable of operating fast enough to meet system requirements. At the exact time of switching, PA-translator 1 205 becomes available and is connected to digital processor 130 with the HQ 2 waveform, thus enabling PA-translator 1 205 to configure for a HQ transmission as shown in FIG. 3.

Figure 4:
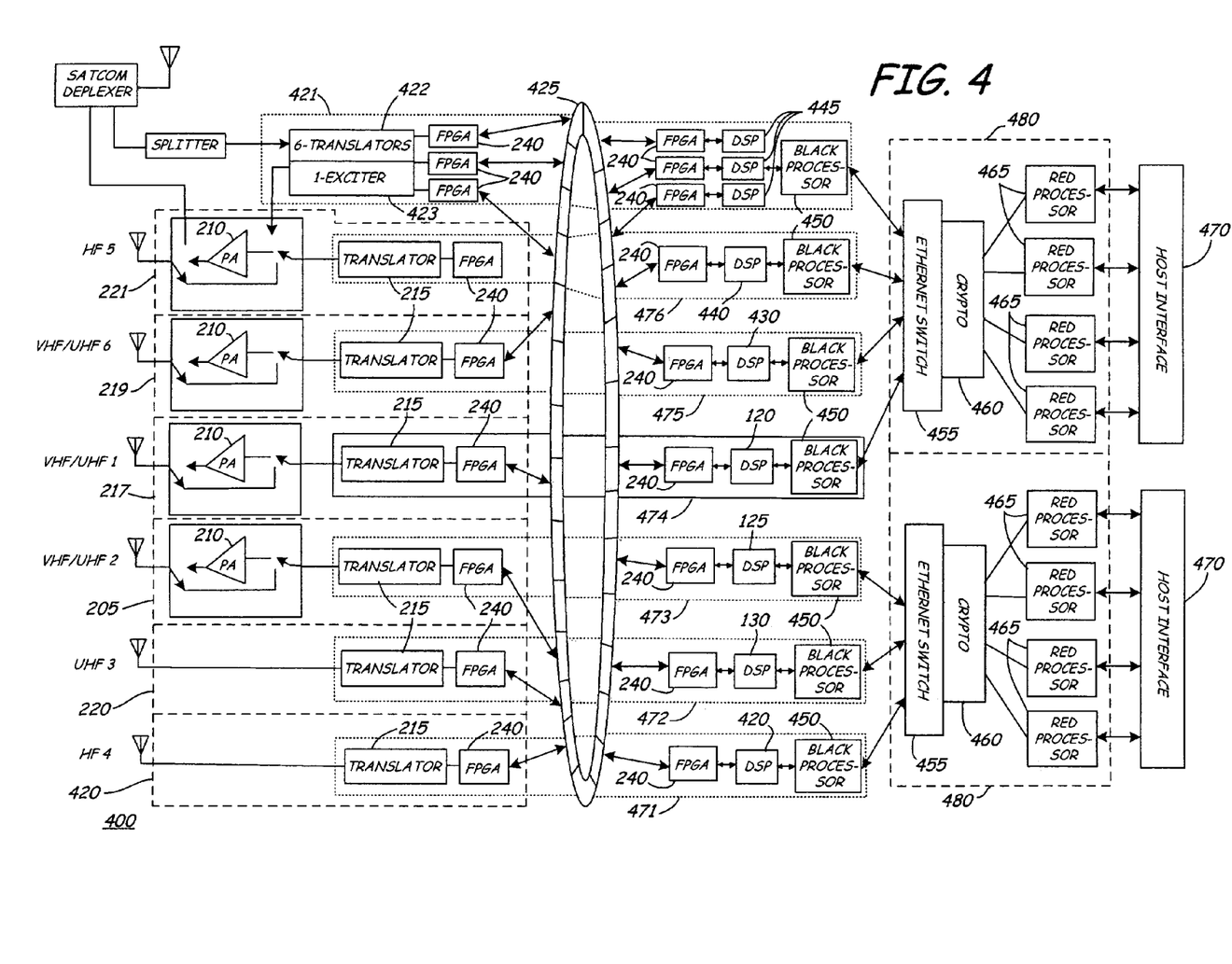
FIG. 4 is block diagram of an alternate embodiment of the virtual channel communications system of the present invention employing a inter-transceiver high speed TDMA bus.

An alternate embodiment of the virtual channel communications system of the present invention is shown in FIG. 4. FIG. 4 is a block diagram of a complete E-2C communications system 400 employing the present invention and used as an example. Seven communications channels are shown in FIG. 4 comprising two receive channels with universal translators 215 (HF 4 420 and UHF 3 220), four PA-translator channels with universal power amplifiers 210 and translators 215 (VHF/UHF 1 217, VHF/UHF 2 205, VHF/UHF 6 219, and HF 5 221), and one SATCOM channel 421.

In FIG. 4 a dedicated inter-universal transceiver very high speed communications bus 425 allows digital signal processors 120, 125, 130, 420, 430, and 440 in any one universal transceiver 471-476 to be made available to any other universal transceiver 471-476. Universal transceivers 471-476 comprise the translators 215, FPGAs 240, the dedicated inter-universal transceiver very high speed communications bus 425, digital signal processors 120, 125, 130, 420, 430, and 440 that provide the various communications waveforms as described in conjunction with FIGS. 2 and 3, and ciphered text processors commonly referred to as black processors 450.

The communications bus 425 exists between the FPGAs 240 within the universal transceivers 471-476. This communications bus 425 takes the place of the digital switch 225 in FIG. 2 and is a redundant TDMA data bus that allows high speed streaming digital data to be routed to any destination on the TDMA bus high speed interconnect. In FIG. 4, field programmable gate arrays (FPGA) 240 that operate at analog to digital converter (ADC) sampling rates of ADCs (not shown) in the translators 215 interface the communications bus 425. The FPGAs 240 may be high-speed serial shift registers that load and unload data to the TDMA communications bus 425.

Figure 5:
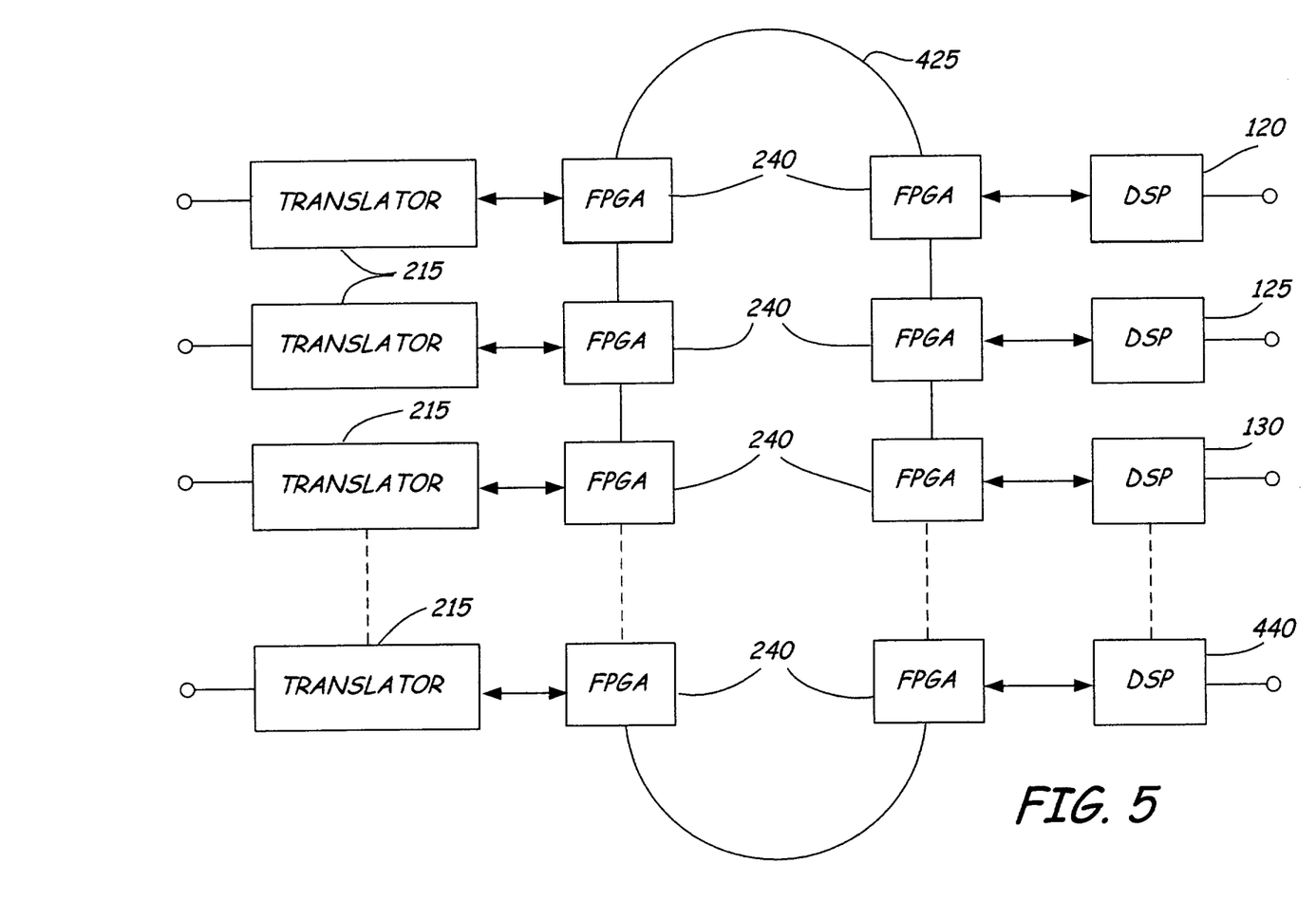
FIG. 5 is block diagram showing more detail of the TDMA bus of FIG. 4.

The TDMA bus 425 is described in more detail in conjunction with FIG. 5. In FIG. 5 the FPGAs are high-speed serial shift registers that are interconnected in a ring structure. Only a portion of the TDMA bus is shown in FIG. 5 to explain its operation. The bus 425 may be increased or reduced in size to accommodate any number of digital signal processors 120, 125, 130, and 440 and translators 215. The digital signal processors 120, 125, 130, 440 are programmed to transmit and receive communications waveforms and data as previously discussed and transmit or receive data from the bus 425 by loading or unloading the FPGA shift registers 240. When a digital signal processor 120, 125, 130, 440 has data to transmit, it loads the data in the FPGA shift register 240. When a digital signal processor is in receive it unloads data from the FPGA shift register 240. In a similar fashion, translators 215 load or unload data from the bus 425 through the FPGA shift registers 240 to which the translators 215 are connected. The translators 215 load data to the shift registers 240 when the translators 215 are in receive. The translators 215 unload data from the shift registers 240 when the translators are in transmit.

Figure 6:
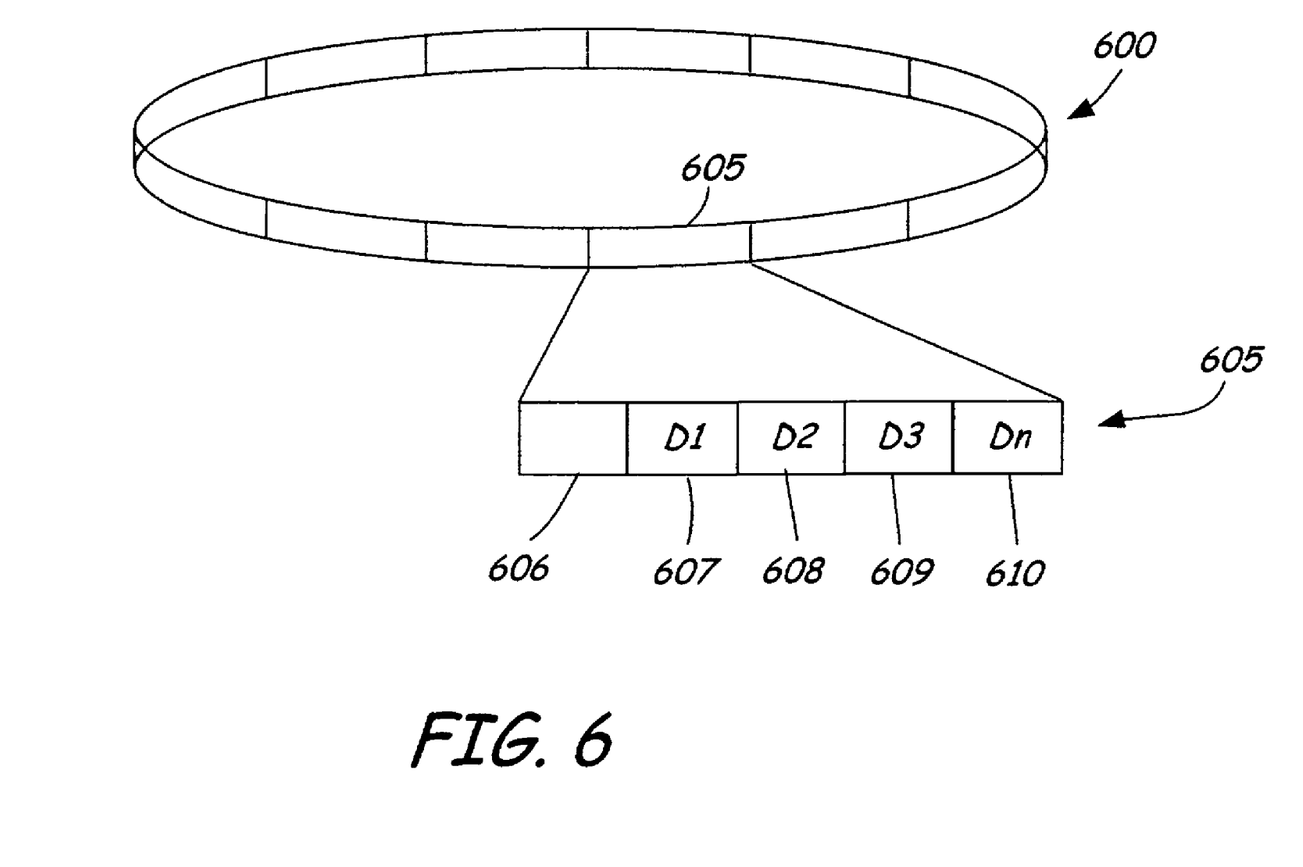
FIG. 6 shows a typical TDMA structure that may be used on the TDMA bus of FIGS. 4 and 5.

A typical TDMA structure is shown in FIG. 6 that may be used to implement the high-speed TDMA communications bus 425. A cycle 600 may be divided into frames 605. Each frame 605 may be divided into time slots with one time slot being a header 606 and the remaining time slots 607-610 containing transmit and receive data loaded in to the bus 425 by the translators 215 or digital signal processors 120, 125, 130, and 440. The header 606 may contain such data as current status of a translator 215 such as receive or transmit, translator parameter setup (frequency, filter bandwidths, modulation, etc.) A request from a DSP for use of a translator 215 for transit or receive may be contained in the header 606 along with the parameters needed for setup of the translator 215. The request from the DSP may contain a priority level for translator 215 usage. A request from a senior officer or an emergency request will have a higher priority than routine communications. When a request from a DSP is accepted by a translator 215, a hand shake message is included in the header and sent back to the requesting DSP acknowledging availability. The DSP then starts loading its message data in to one or all of the data slots 607-610 along with identify information so that the correct translator extracts the correct data for transmission.

Also shown in FIG. 4 are classified data processors, commonly referred to as red processors 465, and reprogrammable embedded cryptographic engines 460 that are switched with Ethernet switches 455. Platform host interfaces 470 complete the example E-2C system 400.

The virtual channel communications system 400 flexibility extends across all communication system waveforms. For example, if one of the SATCOM translators 422 in FIG. 4 fails, a PA-translator 205, 217, 219, or 220 can be used to receive any of the SATCOM transmit waveforms. The SATCOM module 421 in FIG. 4 has five translators 422 (and provision for a sixth), all of which can be used to receive any of the SATCOM waveforms. If one of processors 445 in the SATCOM module 421 fails, any of the processors 120, 125, 130, 420, 430, and 440 in the universal transceivers 471-476 can be assigned the needed SATCOM waveform application. All of these capabilities serve to keep the E-2C on station when a pooled resource, either analog or digital fails.

SATCOM, with a requirement of five reception channels (transceivers 422) and one transmit (exciter 423), with design requirement for an additional reception and optional additional transmit channel, is able to take tremendous advantage of utilizing virtual digital processing channels. Because of the narrow channel bandwidths and resulting low data rates, configurable commercial digital down converters (DDC) (not shown) are able to be used on the receive path while a digital up converter (DUC) (not shown) is used on the transmit path within the translators 215. These chips, an outgrowth of the cellular industry, allow for remarkable reductions in power and volume due to their multi-channel capability.

The virtual communications system 400 in FIG. 4 of the present invention decreases the amount of hardware used for VHF/UHF communications while increasing both utility and operational capability. This accomplished by using pools of reprogrammable resources that can be allocated as needed and returned to the pool when not needed. There are six pools of resources that collectively form a Software Defined Radio System:

a) Classified data processors, commonly referred to as red processors 465 b) Ciphered text processors, commonly referred to as black processors 450 c) Reprogrammable embedded cryptographic engines 460 d) Digital signal processors 120, 125, 130, 420, 430, and 440 e) Universal translators 215 and f) Universal power amplifiers 210.

These six pools of resources are mechanically packaged into three equipment building block types:

1) Networking Infosec Unit (NIU): The NIU 480 in FIG. 4 contains the red processors 465, cryptographic engines 460, and Ethernet switches 455. Also contained within the NIU 480 is bulk memory storage (not shown) for all waveforms used in the virtual communications system 400. For redundancy, there are two NIUs 480 in the virtual communications system 400, both identical. The NIUs 480 have dedicated communications (not shown) between each other to allow resource sharing. A host interface 470, referred to as a platform interface adapter is bolted onto the front of the NIU 480 and provides connector interfacing to an aircraft.

2) Universal Transceiver: Each of the universal transceivers 471-476 contain the black processors 450 all digital signal processing (120, 125, 130, 420, 430, and 440) and the 2-MHz to 2000-MHz universal translators 215 for receiving and transmitting. In addition there are internal cosite filters (not shown) for all waveforms in the 30-MHz to 400-MHz spectrum. The dedicated inter-universal transceiver very high speed communications bus 425 allows the signal processing resources in one universal transceiver 471-476 to be made available to any other universal transceiver 471-476.

3) Universal Power Amplifier: The universal power amplifier 210 contains a 100-watt continuous duty cycle transmit amplifier that covers 30 MHz to 400 MHz. Additional reception and transmission cosite filtering that is needed beyond what the universal transceivers 471-476 provide is located here. Switching is provided that allows the interface flexibility needed to operate in all modes to all antenna types.

By use of these three types of building blocks and a new intercommunications control and data flow system a new architecture is disclosed that achieves the objectives with the most important objective being weight reduction.

With the present invention, waveforms have complete mobility between the RF resources available. This flexibility can be exploited for weight reduction and increased transmit capability. There are no technical limitations that preclude adding additional power amplifiers 210 at the expense of additional weight as the virtual communications channel architecture 400 supports any number of power amplifiers 210, from one to greater then the number of channels.

The reliability implications of multiple virtual channels are quite substantial. For example, the VHF/UHF power amplifier's availability requirement to be fully operational is met by four power amplifiers 210. If nothing is changed but to increase the PA pool from four to five power amplifiers 210, the MTBF rises from. This shows what system reliability can be obtained by the use of assignable, reconfigurable power amplifiers 210 operating in a pool to form virtual amplifiers upon demand. It follows that mission success will also be considerably greater because the platform will be able to remain on station regardless of multiple power amplifier losses because no channels of communication will be lost, only total transmit time would be reduced.

It is believed that the virtual channel communications system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A virtual channel communications system that assigns RF resources to communications waveforms for transmitting and receiving signals said communications system comprising:

a plurality of universal transceivers for generating and processing the signals said universal transceivers comprising:

translators for translating baseband transmit signals to RF transmit signals and RF receive signals to baseband receive signals;

digital signal processors for generating the communications waveforms and processing baseband receive and transmit signals; and an inter-transceiver communications bus connected to the translators and the digital signal processors to communicate between the plurality of universal transceiver wherein said communications bus interconnects a digital signal processor in any of said plurality of universal transceivers to a translator in any of said plurality of universal transceivers; and a plurality of universal power amplifiers connected to the plurality of universal transceivers for amplifying the RF transmit signals;

wherein when one of said digital signal processors requires transmission said communications bus switches said one digital signal processor to an available PA-translator;

wherein said communications bus includes a TDMA communications bus, said digital signal processors and PA-translators communicating within assigned time slots; and wherein said communications bus further includes a plurality of field programmable gate arrays programmed as shift registers interconnected in a ring, said digital signal processors loading data into and unloading data out of said shift registers and said translators loading data into and unloading data out of said shift registers.

2. The virtual channel communications system of claim 1 wherein a number of universal power amplifiers, each power amplifier having a 100 percent duty cycle, equals or exceeds a total predetermined transmit duty cycle requirement of the plurality of digital signal processors.

* * * * *